United States Patent Office 2,931,790
Patented Apr. 5, 1960

2,931,790

COPOLYMERS AND METHOD FOR THE PREPARATION THEREOF

William S. Barnhart, Cranford, and Elizabeth Shen Lo, Elizabeth, N.J., assignors, by mesne assignments, to Minnesota Mining and Manufacturing Company, St. Paul, Minn., a corporation of Delaware No Drawing. Application March 28, 1955
Serial No. 497,428

32 Claims. (Cl. 260—83.5)

This invention relates to copolymers formed by copolymerizing esters of perchlorofluorocarboxylic acids with ethylenically unsaturated comonomers.

The esters which are copolymerized with the ethylenically unsaturated comonomers in accordance with the present invention are unsaturated esters of perchlorofluorocarboxylic acids, and these esters may be prepared in a variety of ways, for example, by direct esterification of a perchlorofluorocarboxylic acid or a perchlorofluoro acid chloride with an unsaturated alcohol, such as allyl, crotyl, tiglyl alcohols, and the like. These alcohols may also be halogen substituted, if desired. The preparation of these and other esters useful in the process of the present of the present invention is disclosed in copending application Serial No. 493,554, filed March 10, 1955, now Patent No. 2,856,388. The esters which are useful in the present invention are those prepared, according to the disclosures of the aforementioned application, from perchlorofluorocarboxylic acids or perchlorofluoro acid chlorides, having from about 4 to about 20 carbon atoms.

A wide variety of comonomers may be copolymerized with the unsaturated perchlorofluorocarboxylic acid esters, and these comonomers may be, for example, perhalogenated alkanes, such as chlorotrifluoroethylene, 1,1-dichlorodifluoroethylene, bromotrifluoroethylene, chloropentafluoropropene, and the like or perfluorinated alkanes, such as tetrafluoroethylene, hexafluorobutadiene, hexafluoropropene, and the like or partially halogenated alkanes, such as fluoroprene, chloroprene, chlorofluoroethylene, vinylidene fluoride, vinylidene chloride, trifluorobutadienes, trifluoromethyl butadienes, trifluoromethyl styrenes, and the like or hydrocarbons, such as ethylene, propene, butadiene, styrene, and the like or oxygen-containing compounds, such as vinyl isobutyl ether, methyl methacrylate, butyl acrylate, vinyl butyrate, vinyl acetate, and the like or nitrogen-containing compounds, such as acrylonitrile, acrylamide, fluoroacrylonitrile, trifluoromethyl acrylonitrile, and the like.

The ratio of the perchlorofluorocarboxylic acid ester or diester to the ethylenically unsaturated comonomer in the reaction mixture may be between about 3:97 to 95:15 parts by weight, respectively, preferably between 5:95 to 80:20 parts by weight, respectively, depending upon the reactants copolymerized and the characteristics desired in the copolymer product. The temperature of polymerization may be between −30° C. and +150° C., preferably between 20° C. and 60° C. The time of reaction may be between about 1 and 120 hours, preferably between 20 and 100 hours. The pressure in the polymerization vessel may be from 0 to 1000 p.s.i.g. The copolymers preferably are prepared under autogenous pressure, i.e., 0 to 500 p.s.i.g.

A number of polymerization recipes may be used to produce the copolymers of the invention. One of the recipes which may be used is a water suspension type catalyst system in which a redox catalyst is used which comprises an oxidant and a reductant. The oxidant is preferably an inorganic persulfate, such as potassium persulfate, sodium persulfate, or ammonium persulfate, and the reductant is preferably a bisulfite, such as potassium bisulfite, sodium bisulfite, potassium metabisulfite, or sodium metabisulfite. The oxidant is used in a quantity equivalent to 0.1 to 5 parts by weight per 100 parts of total monomers present and preferably is used in a quantity equivalent to 0.5 to 2 parts by weight per 100 parts of total comonomers present. The reductant may be used in a quantity equivalent to 0.05 to 5.0 parts by weight per 100 parts of total comonomers present and preferably is used in the range of 0.1 to 2 parts by weight per 100 parts of total comonomers present. A buffer such as sodium tetraborate may also be used, if desired, together with the oxidant and the reductant. Also, about 0.01 to 1 part by weight per 100 parts of total comonomers present of a variable valence metal salt may be used, this salt preferably being an iron salt such as ferrous sulfate of ferrous nitrate, and serving as an activator. However, the reductant and the variable valence metal salt may be eliminated, if desired, and the comonomers may be polymerized in a water suspension system which contains the oxidant only.

It is also advantageous to add to the water suspension type catalyst system a dispersing or emulsifying agent, examples of which are the salts, preferably the ammonium salt or potassium salts of polyfluorocarboxylic acids or perchlorofluorocarboxylic acids. The ammonium salt or potassium salts of polyfluorocarboxylic acids and perchlorofluorocarboxylic acids are generally present in a quantity between 0.5 and about 10 parts by weight per 100 parts of total comonomers present. The copolymerization is preferably conducted under mildly alkaline conditions, and the pH may be controlled, if desired, by the addition of a suitable buffer. The polyfluorocarboxylic acids which may be used are those disclosed in United States Patent No. 2,559,752, and the derivatives of the acids disclosed therein as being efficacious dispersing agents in polymerization reactions may also be employed in the process of the present invention. The perchlorofluorocarboxylic acids which may be used in the process of the present invention are those disclosed in copending application Serial No. 463,073, filed October 18, 1954, as being useful as dispersing agents in polymerization reactions.

The copolymerization reactions may also be effected in a mass or bulk polymerization system using an organic peroxide promoter at a temperature within the range of about −30 to +30° C. Of the organic peroxide promoters which may be used, halogen substituted acetyl peroxides, such as trichloroacetyl peroxide, are preferred. Exemplary of other peroxides which may be used are trifluoroacetyl peroxide, chloroacetyl peroxide, difluoroacetyl peroxide, and perfluoropropionyl peroxide.

Solution polymerization generally is not used to produce the copolymers of the present invention, since the esters of perchlorofluorocarboxylic acids used as monomers are insoluble in ordinary solvents.

The copolymers of the present invention are useful as rubber substitutes, adhesives, and laminates. The copolymers in this invention may be pressed at temperatures between 300 to 350° F. to give continuous flexible films. These copolymers may also be molded at similar temperatures.

The invention will be further illustrated by reference to the following specific examples:

EXAMPLE 1

A number of copolymers of unsaturated esters and diesters of perchlorofluorocarboxylic acids were prepared.

The conditions for the preparation of these copolymers are listed in the tables below. The copolymers were prepared according to the following general method:

A glass polymerization tube was evacuated, flushed with nitrogen, and one of the following polymerization recipes was added thereto:

(1) 1 gram of potassium persulfate dissolved in 200 grams of water.

(2) 0.75 gram of perfluorooctanoic acid dissolved in 150 grams of water and 1 gram of potassium persulfate dissolved in 50 grams of water. The pH of the combined emulsion medium was adjusted to 7 using a 2.5 percent solution of potassium hydroxide.

(3) In this recipe, the ingredients are separately added to the polymerization tube: 0.4 gram sodium metabisulfite dissolved in 20 grams of water, 5 grams of potassium stearate dissolved in about 100 grams of water, the pH of this solution being adjusted to 11 with potassium hydroxide solution, and 1 gram of potassium persulfate dissolved in about 80 grams of water.

(4) 0.75 gram of $Cl(CF_2-CFCl)_3CF_2COOH$ dissolved in about 150 grams of water and 1 gram of potassium persulfate dissolved in about 50 grams of water. The pH of the solution was adjusted to 7 with potassium hydroxide solution.

The total quantity of water in each of the above recipes is 200 grams.

The tube was then frozen in liquid nitrogen and the monomers were added separately in the quantities noted in the tables below. The tube was frozen after each addition and sealed under vacuum, after which it was placed in a constant temperature bath and tumbled end-over-end at the temperature indicated and for the time specified in the tables below. The tube was then refrozen and the copolymers were removed and washed with hot water to remove emulsifying agents, inorganic salts, and unreacted monomers. The copolymers were then dried in a vacuum oven at a temperature of 35° C. until constant weight was obtained, and an analysis for fluorine or chlorine was then made.

It will be obvious to those skilled in the art that many modifications may be made within the scope of the present invention without departing from the spirit thereof, and the invention includes all such modifications.

*Table I*

PRINCIPAL MONOMER: $Cl(CF_2CFCl)_2CF_2CO_2CH_2CH=CH_2$

| No. | Comonomers (x) | Mole Ratio Principal Monomer/(x) | | Weight Ratio Charged Principal Monomer/x (grams) | Polymerization Conditions | | | Percent Conversion | Appearance |
|---|---|---|---|---|---|---|---|---|---|
| | | Charged | Combined | | Time (hrs.) | Temp., °C. | Recipe | | |
| 1 | $CF_2=CFCl$ | 22.4/77.6 | 27.5/72.5 | 50/50 | 96 | 50 | (1) | 92 | Hard particles. |
| 2 | $CF_2=CFCl$ | 22.4/77.6 | 27.5/72.5 | 50/50 | 96 | 50 | (2) | 85 | Transparent hard rubber. |
| 3 | $CF_2=CFCl$ | 22.4/77.6 | 21/79 | 50/50 | 24 | 50 | (1) | 68 | Transparent slow rubber. |
| 4 | $CF_2=CFCl$ | 10/90 | 47/53 | 29.6/70.4 | 22 | 50 | (1) | 28 | Transparent sticky rubber. |
| 5 | $CF_2=CFCl$ | 10/90 | 54/46* | 29.6/70.4 | 23 | 50 | (1) | 74 | White powder. |
| 6 | $CF_2=CFCl$ | 10/90 | 40/60* | 29.6/70.4 | 23 | 50 | (4) | 81 | Do. |
| 7 | $CF_2=CFCl$ | 22.4/77.6 | 61.5/38.5* | 50/50 | 23 | 50 | (1) | 79 | Hard rubber. |
| 8 | $CF_2=CFCl$ | 22.4/77.6 | 25.99 percent Cl found (too low for either homopolymer). | 50/50 | 23 | 50 | (4) | 77 | Do. |
| 9 | $CH_2=CFCH=CH_2$ | 20/80 | 27.5/72.5 | 58.8/41.2 | 22 | 50 | (1) | 28 | Short rubber. |
| 10 | $CH_2=CFCl$ | 20/80 | 19.5/80.5 | 46.8/53.2 | 22 | 50 | (1) | 78 | Transparent, resinous rubber. |
| 11 | $CF_2=CFCH=CH_2$ | 20/80 | 20/80 | 48.6/51.4 | 22 | 50 | (1) | 47 | White short rubber. |
| 12 | $CH_2=CClCH=CH_2$ | 15/85 | 0.5/99.5 | 44.6/55.4 | 72 | 25 | (1) | 20 | Rubber. |
| 13 | $CF_2=CHCF=CH_2$ | 21/79 | 7.5/92.5 | 50/50 | 24 | 50 | (1) | 18 | Snappy rubber. |
| 14 | $CH_2=\overset{CF_3}{\underset{|}{C}}CH=CH_2$ | 23/77 | 2.5/97.5 | 49.6/50.4 | 25 | 50 | (1) | 8 | Transparent soft rubber. |
| 15 | $CH_2=\overset{CF_3}{\underset{|}{C}}CH=CH_2$ | 23/77 | 1/99 | 49.6/50.4 | 24 | 50 | (2) | 51 | Rubber. |
| 16 | $CH_2=\overset{CF_3}{\underset{|}{C}}CH=CH_2$ | 10/90 | 2.5/97.5 | 36.8/63.2 | 68 | 65 | (3) | 64 | Tough rubber. |
| 17 | $CF_2=CFCH=CH_2$ | 20/80 | 5.5/94.5 | 48.2/51.8 | 68 | 65 | (2) | 52 | Short rubber. |
| 18 | $CF_2=CHCF=CH_2$ | 20/80 | 7/93 | 48.2/51.8 | 68 | 65 | (3) | 43 | Soft rubber. |
| 19 | $CH_2=CFCH=CH_2$ | 10/90 | 0.5/99.5 | 38.4/61.6 | 68 | 65 | (2) | 48 | Short rubber. |

*Reason for unexpected analytical results undetermined.

*Table II*

PRINCIPAL MONOMER: $Cl(CF_2CFCl)_3CF_2CO_2CH_2CH=CH_2$

| No. | Comonomers (x) | Mole Ratio Principal Monomer/(x) | | Weight Ratio Charged Principal Monomer/x (grams) | Polymerization Conditions | | | Percent Conversion | Appearance |
|---|---|---|---|---|---|---|---|---|---|
| | | Charged | Combined | | Time (hrs.) | Temp., °C. | Recipe | | |
| 1 | $CF_2=CFCl$ | 20/80 | loss of Cl | 53.8/46.2 | 68 | 50 | (1) | 45 | waxy. |
| 2 | $CFCl=CH_2$ | 20/80 | 9.5/90.5 | 45.2/54.8 | 68 | 50 | (1) | 80 | soft rubber. |

Table III

PRINCIPAL MONOMER: $CH_2=CHCH_2OOC(CF_2CFCl)_2COOCH_2CH=CH_2$

| No. | Comonomers (x) | Mole Ratio Principal Monomer/(x) Charged | Mole Ratio Principal Monomer/(x) Combined | Weight Ratio Charged Principal Monomer/x (grams) | Polymerization Conditions Time (hrs.) | Polymerization Conditions Temp., °C. | Polymerization Conditions Recipe | Percent Conversion | Appearance |
|---|---|---|---|---|---|---|---|---|---|
| 1 | $CH_2=\overset{CF_3}{\underset{|}{C}}CH=CH_2$ | 10/90 | 5/95 | 32.2/67.8 | 25 | 50 | 3 | 76 | Soft rubber. |
| 2 | $CF_2=CFCl$ | 10/90 | 34/66* | 33.2/66.8 | 24 | 50 | 4 | 88 | White powder. |
| 3 | $CF_2=CFCl$ | 5/95 | 15/85* | 19.0/81.0 | 24 | 50 | 4 | 93 | Do. |
| 4 | $CF_2=CFCl$ | 2/98 | 10/90* | 8.4/91.6 | 24 | 50 | 4 | 94 | Do. |
| 5 | $CH_2=\overset{CF_3}{\underset{|}{C}}CH=CH_2$ | 20/80 | 7.5/92.5 | 51/49 | 68 | 65 | 3 | 90 | Soft rubber. |
| 6 | $CH_2=CFCH=CH_2$ | 10/90 | 5.5/94.5 | 44/66 | 68 | 65 | 2 | 71 | Short rubber. |
| 7 | $CF_2=CHCF=CH_2$ | 10/90 | 9/91 | 34.8/65.2 | 68 | 65 | 3 | 68 | Very short rubber. |
| 8 | $CF_2=CFCH=CH_2$ | 10/90 | 5.5/94.5 | 34.8/65.2 | 68 | 65 | 2 | 77 | Rubbery hard particles. |

*Reason for unexpected analytical results undetermined.

We claim:

1. A copolymer of between about 3 and about 97 parts by weight of a perchlorofluorocarboxylic acid ester of a carbon-to-carbon unsaturated alcohol and between about 95 and about 15 parts by weight of a polymerizable ethylenically unsaturated comonomer, said perchlorofluorocarboxylic acid containing recurring groups of —$CF_2CFCl$—

2. A copolymer of between about 3 and about 97 parts by weight of a perchlorofluorocarboxylic acid monoester of a carbon-to-carbon unsaturated alcohol and between about 95 and about 15 parts by weight of a polymerizable ethylenically unsaturated comonomer, said perchlorofluorocarboxylic acid containing recurring groups of —$CF_2CFCl$—.

3. A copolymer of between about 3 and about 97 parts by weight of a perchlorofluorocarboxylic acid diester of a carbon-to-carbon unsaturated alcohol and between about 95 and about 15 parts by weight of a polymerizable ethylenically unsaturated comonomer, said perchlorofluorocarboxylic acid containing recurring groups of —$CF_2CFCl$—.

4. A copolymer of between about 3 and about 97 parts by weight of a perchlorofluoro carboxylic acid ester of a carbon-to-carbon unsaturated alcohol and between about 95 and about 15 parts by weight of a polymerizable ethylene comonomer selected from the group consisting of ethylene and halogenated ethylenes, said perchlorofluorocarboxylic acid containing recurring groups of —$CF_2CFCl$—.

5. A copolymer of between about 3 and about 97 parts by weight of a perchlorofluorocarboxylic acid ester of a carbon-to-carbon unsaturated alcohol and between about 95 and about 15 parts by weight of a polymerizable diene comonomer, said perchlorofluorocarboxylic acid containing recurring groups of —$CF_2CFCl$—.

6. A copolymer of between about 3 and about 97 parts by weight of a compound having the formula $$Cl(CF_2-CFCl)_{n-1}CF_2\overset{O}{\underset{\|}{C}}-O-R$$

in which n is an integer from 2 to 10 and R is an alkenyl group, and between about 95 and about 15 parts by weight of a polymerizable ethylenically unsaturated comonomer.

7. A copolymer of between about 3 and about 97 parts by weight of a compound having the formula $$R-O-\overset{O}{\underset{\|}{C}}-(CFCl-CF_2)_{n-1}-\overset{O}{\underset{\|}{C}}-O-R$$

in which n is an integer from 2 to 10 and R is an alkenyl group, and between about 95 and about 15 parts by weight of a polymerizable ethylenically unsaturated comonomer.

8. A copolymer of between about 3 and about 97 parts by weight of a compound having the formula $$Cl(CF_2-CFCl)_{n-1}CF_2\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable ethylenically unsaturated comonomer having not in excess of about 20 carbon atoms.

9. A copolymer of between about 3 and about 97 parts by weight of a compound having the formula $$R-O-\overset{O}{\underset{\|}{C}}-(CF_2-CFCl)_{n-1}\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable ethylenically unsaturated comonomer having not in excess of about 20 carbon atoms.

10. A copolymer of between about 3 and about 97 parts by weight of a compound having the formula $$Cl(CF_2-CFCl)_{n-1}CF_2\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable ethylene comonomer.

11. A copolymer of between about 3 and about 97 parts by weight of a compound having the formula $$Cl(CF_2-CFCl)_{n-1}CF_2\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable diene comonomer.

12. A copolymer of between about 3 and about 97 parts by weight of a compound having the formula $$R-O-\overset{O}{\underset{\|}{C}}-(CF_2-CFCl)_{n-1}\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable ethylene comonomer.

13. A copolymer of between about 3 and about 97 parts by weight of a compound having the formula $$R-O-\overset{O}{\underset{\|}{C}}-(CF_2-CFCl)_{n-1}\overset{O}{\underset{\|}{C}}-O-R$$

in which n is an integer from 2 to 10 and R is an alkenyl group having not in excess of about 20 carbon atoms, and between about 95 and about 15 parts by weight of a polymerizable diene comonomer.

14. A copolymer of between about 3 and about 97 parts by weight of a compound having the formula

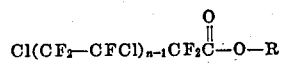

in which n is an integer from 2 to 10 and R is an alkenyl group having not in excess of about 20 carbon atoms, and between about 95 and about 15 parts by weight of chlorotrifluoroethylene.

15. A copolymer of between about 3 and about 97 parts by weight of a compound having the formula

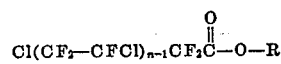

in which n is an integer from 2 to 10 and R is an alkenyl group having not in excess of about 20 carbon atoms, and between about 95 and about 15 parts by weight of 1-chloro, 1-fluoroethylene.

16. A copolymer of between about 3 and about 97 parts by weight of a compound having the formula

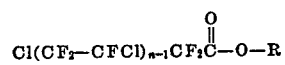

in which n is an integer from 2 to 10 and R is an alkenyl group having not in excess of about 20 carbon atoms, and between about 95 and about 15 parts by weight of fluoroprene.

17. A copolymer of between about 3 and about 97 parts by weight of a compound having the formula

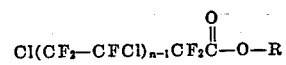

in which n is an integer from 2 to 10 and R is an alkenyl group having not in excess of about 20 carbon atoms, and between about 95 and about 15 parts by weight of chloroprene.

18. A copolymer of between about 3 and about 97 parts by weight of a compound having the formula

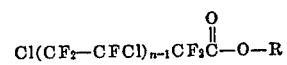

in which n is an integer from 2 to 10 and R is an alkenyl group having not in excess of about 20 carbon atoms, and between about 95 and about 15 parts by weight of 1,1,3-trifluorobutadiene.

19. A copolymer of between about 3 and about 97 parts by weight of a compound having the formula

in which n is an integer from 2 to 10 and R is an alkenyl group having not in excess of about 20 carbon atoms, and between about 95 and about 15 parts by weight of chlorotrifluoroethylene.

20. A copolymer of between about 3 and about 97 parts by weight of a compound having the formula

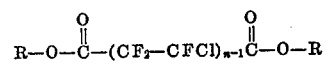

in which n is an integer from 2 to 10 and R is an alkenyl group having not in excess of about 20 carbon atoms, and between about 95 and about 15 parts by weight of trifluoromethylbutadiene.

21. A copolymer of between about 3 and about 97 parts by weight of a compound having the formula

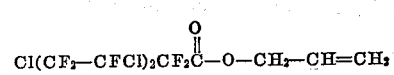

and between about 95 and about 15 parts by weight of chlorotrifluoroethylene.

22. A copolymer of between about 3 and about 97 parts by weight of a compound having the formula

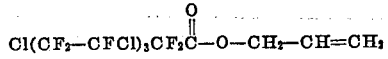

and between about 95 and about 15 parts by weight of chlorotrifluoroethylene.

23. A copolymer of between about 3 and about 97 parts by weight of a compound having the formula

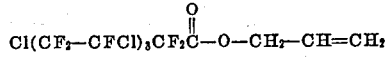

and between about 95 and about 15 parts by weight of 1-chloro, 1-fluoroethylene.

24. A copolymer of between about 3 and about 97 parts by weight of a compound having the formula

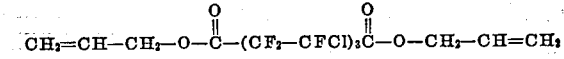

and between about 95 and about 15 parts by weight of chlorotrifluoroethylene.

25. A copolymer of between about 3 and about 97 parts by weight of a compound having the formula

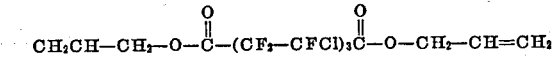

and between about 95 and about 15 parts by weight of trifluoromethylbutadiene.

26. A process which comprises copolymerizing between about 3 and about 97 parts by weight of a perchlorofluorocarboxylic acid ester of a carbon-to-carbon unsaturated alcohol and between about 95 and about 15 parts by weight of a polymerizable ethylenically unsaturated comonomer, at a temperature between about —30° C. and about +150° C., said perchlorofluorocarboxylic acid containing recurring groups of —CF$_2$CFCl—.

27. A process which comprises copolymerizing between about 3 and about 97 parts by weight of a compound having the formula

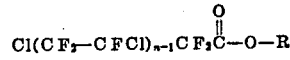

in which n is an integer from 2 to 10 and R is an alkenyl group having not in excess of about 20 carbon atoms, and between about 95 and about 15 parts by weight of a polymerizable ethylenically unsaturated comonomer having not in excess of about 20 carbon atoms, the process being carried out at a temperature of between about —30° C. and about +150° C.

28. A process which comprises copolymerizing between about 3 and about 97 parts by weight of a compound having the formula

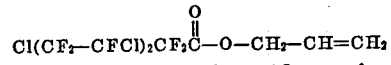

and between about 95 and about 15 parts by weight of chlorotrifluoroethylene at a temperature range of between about —30° C. and about +150° C.

29. A process which comprises copolymerizing between about 3 and about 97 parts by weight of a compound having the formula

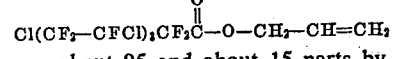

and between about 95 and about 15 parts by weight of chlorotrifluoroethylene at a temperature range of between about —30° C. and about +150° C.

30. A process which comprises copolymerizing between about 3 and about 97 parts by weight of a compound having the formula

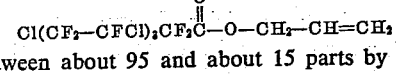

and between about 95 and about 15 parts by weight of 1-chloro, 1-fluoroethylene at a temperature range of between about —30° C. and about +150° C.

31. A process which comprises copolymerizing between about 3 and about 97 parts by weight of a compound having the formula

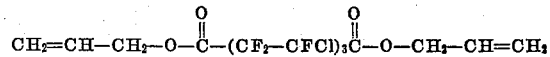

and between about 95 and about 15 parts by weight of chlorotrifluoroethylene at a temperature range of between about −30° C. and about +150° C.

32. A process which comprises copolymerizing between about 3 and about 97 parts by weight of a compound having the formula

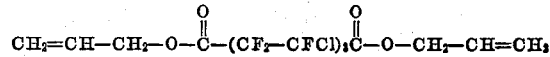

and between about 95 and about 15 parts by weight of trifluoromethylbutadiene at a temperature range of between about −30° C. and about +150° C.

References Cited in the file of this patent

UNITED STATES PATENTS

| | | |
|---|---|---|
| 2,456,255 | Coffman et al. | Dec. 14, 1948 |
| 2,484,529 | Roedel | Oct. 11, 1949 |
| 2,524,513 | Cass | Oct. 3, 1950 |
| 2,539,438 | Kropa et al. | Jan. 30, 1951 |
| 2,592,069 | Reid | Apr. 8, 1952 |
| 2,668,182 | Miller | Feb. 2, 1954 |
| 2,759,912 | Coover et al. | Aug. 21, 1956 |

UNITED STATES PATENT OFFICE
CERTIFICATE OF CORRECTION

Patent No. 2,931,790              April 5, 1960

William S. Barnhart et al.

It is hereby certified that error appears in the printed specification of the above numbered patent requiring correction and that the said Letters Patent should read as corrected below.

Column 5, lines 23, 31, 38, 45, 53, 59, and 68, column 6, lines 22, 32, 42, 51, 60, and 69, column 7, lines 3, 12, 22, 31, 40, 50, 59, and 68, column 8, lines 1, 8, 15, 22, 30, 37, 50, 59, and 68, and column 9, lines 2 and 10, for "97", each occurrence, read -- 95 --; column 5, lines 26, 34, 41, 48, 56, 65, and 73, column 6, lines 29, 39, 49, 58, and 67, column 7, lines 1, 10, 20, 29, 38, 48, 57, 66, and 74, column 8, lines 5, 13, 20, 26, 32, 45, 55, 64, and 73, column 9, line 6, and column 10, line 1, for "95", each occurrence, read -- 97 --.

Signed and sealed this 8th day of November 1960.

(SEAL)

Attest:

KARL H. AXLINE                      ROBERT C. WATSON
Attesting Officer                  Commissioner of Patents